(12) United States Patent
Wang

(10) Patent No.: US 12,158,234 B2
(45) Date of Patent: Dec. 3, 2024

(54) SHOOTING BRACKET

(71) Applicant: Wellpa Precision Mold (Shenzhen) Co., Ltd., Guangdong (CN)

(72) Inventor: Xing Wang, Guangdong (CN)

(73) Assignee: Wellpa Precision Mold (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/533,151

(22) Filed: Dec. 7, 2023

(65) Prior Publication Data

US 2024/0309988 A1     Sep. 19, 2024

(30) Foreign Application Priority Data

Mar. 13, 2023     (CN) .......................... 202320551267.4

(51) Int. Cl.
*F16M 11/18*     (2006.01)
*F16M 11/20*     (2006.01)

(52) U.S. Cl.
CPC ........... *F16M 11/18* (2013.01); *F16M 11/205* (2013.01)

(58) Field of Classification Search
CPC .............................. F16M 11/18; F16M 11/205
See application file for complete search history.

(56) References Cited

U.S. PATENT DOCUMENTS

| | | | | |
|---|---|---|---|---|
| 10,174,879 | B2 * | 1/2019 | Zhao | F16M 11/18 |
| 2021/0254786 | A1 * | 8/2021 | Ye | F16M 11/123 |
| 2021/0270407 | A1 * | 9/2021 | Shan | G03B 17/561 |
| 2022/0357640 | A1 * | 11/2022 | Chen | G03B 17/561 |

FOREIGN PATENT DOCUMENTS

| | | | |
|---|---|---|---|
| CN | 209511452 U | 10/2019 | |
| CN | 210034983 U | 2/2020 | |
| GB | 2578637 A * | 5/2020 | ............. F16M 11/24 |

\* cited by examiner

*Primary Examiner* — Eret C McNichols

(57) ABSTRACT

The present application belongs to the technical field of shooting auxiliary equipment and relates to a shooting bracket, which includes a bracket body, a connection device, a clamping device and an auxiliary handle with a hinged end. The connection device is mounted on the bracket body. One of the bracket body and the auxiliary handle is provided with a first limiting part, and the other is provided with a second limiting part matched the first limiting part. When the auxiliary handle is in the folded state, through meshing the first limiting part and the second limiting part, relative rotation between the auxiliary handle and the bracket body is prevented. The shooting bracket is provided with a first limiting part and a second limiting part that is meshed with each other to limit rotation of the clamping device connected to the connection device.

14 Claims, 6 Drawing Sheets

SHOOTING BRACKET

CROSS REFERENCE TO RELATED APPLICATIONS

The present application claims the benefit of Chinese Patent Application No. 202320551267.4 filed on Mar. 13, 2023, the contents of which are incorporated herein by reference in their entirety.

TECHNICAL FIELD

The present application relates to the technical field of shooting auxiliary equipment, and in particular to a shooting bracket.

BACKGROUND TECHNIQUE

With the increasing demand for shooting with mobile phones, shooting brackets such as selfie sticks have emerged as shooting tools for holding mobile phones. The existing shooting bracket is provided with an auxiliary handle for the user to hold to ensure that the camera and the shooting object are always aligned, thereby facilitating shooting. Wherein, when users do not use the auxiliary handle for shooting, they usually fold the auxiliary handle on the main body of the shooting bracket.

However, when users use the shooting bracket with the auxiliary handle folded to shoot, the auxiliary handle in the shooting bracket and the main body of the shooting bracket are prone to rotation or shaking, causing the shooting equipment on the shooting bracket to rotate or shake, which greatly affects the use stability of the shooting bracket and the user's experience, and reduces the shooting effect of the shooting equipment.

Application Content

The purpose of the embodiments of the present application is to solve the technical problems in the existing shooting bracket that the auxiliary handle is easy to rotate in the folded state and the use stability of the shooting bracket is poor.

In order to solve the above technical problems, embodiments of the present application provide a shooting bracket, which adopts the following technical solutions:

the shooting bracket includes:
a bracket body, a connection device, a clamping device and an auxiliary handle with a hinged end;
the connection device is mounted on the bracket body and is rotatable around an extension direction of the bracket body;
the clamping device is rotatably mounted on the connection device;
the hinged end of the auxiliary handle is rotatably mounted on the connection device, so that the auxiliary handle can perform pitching motion relative to the bracket body;
wherein, one of the bracket body and the auxiliary handle is provided with a first limiting part, and the other is provided with a second limiting part matched with the first limiting part; when the auxiliary handle is in a folded state, through meshing of the first limiting part and the second limiting part, relative rotation between the auxiliary handle and the bracket body is prevented.

Further, in the preferred solution of some embodiments, a gear is provided on the top of the bracket body to form the first limiting part; a connection rack that matches the gear is provided at a position of the auxiliary handle near the hinged end to form the second limiting part;
when the auxiliary handle is in a folded state, the auxiliary handle is locked on the bracket body through the mutual meshing between the connection rack and the gear.

Further, in the preferred solution of some embodiments, the gear includes a gear body with gear teeth and a plug-in shaft axially disposed on one side of the gear body; between the connection device and the bracket body, the gear is rotatably connected to the connection device and plugged into the top of the bracket body through the plug-in shaft.

Further, in the preferred solution of some embodiments, a limiting structure is provided between the gear body and the bracket body, and the limiting structure includes a limiting protrusion and a limiting hole;
wherein, one of the gear body and the bracket body is provided with the limiting protrusion, and the other is provided with the limiting hole; when the gear is plugged into the bracket body, the limiting protrusion extends into the limiting hole to limit rotation of the gear.

Further, in the preferred solution of some embodiments, the number of the limiting protrusions is two, and the two limiting protrusions are provided on a side of the gear body facing the bracket body and arranged symmetrically along the center of the gear.

Further, in the preferred solution of some embodiments, the connection device includes a connection frame, the connection frame is rotatably mounted on a side of the gear away from the bracket body, and is rotatably connected with the clamping device;
the auxiliary handle is rotatably mounted on the connection frame, and a rotation axis of the auxiliary handle around the connection frame is perpendicular to a rotation axis of the connection frame around the bracket body.

Further, in the preferred solution of some embodiments, the connection device further includes a latch, an opening is provided on a peripheral side of the connection frame, and the hinged end of the auxiliary handle is plugged into the opening, the latch passes through the connection frame and the auxiliary handle in turn, so that the auxiliary handle is rotatably connected to the connection frame.

Further, in the preferred solution of some embodiments, in the opening, a snap-fit structure is provided between the connection frame and the hinged end; the snap-fit structure includes a snap-fit buckle and a snap-fit slot matched with the snap-fit buckle, one of the connection frame and the hinged end is provided with the snap-fit buckle, and the other is provided with the snap-fit slot; when the auxiliary handle is in a folded state, the snap-fit buckle is snapped in the snap-fit slot.

Further, in the preferred solution of some embodiments, the shooting bracket further includes a plurality of support legs, each of the support legs is rotatably mounted on the bracket body to unfold relative to the bracket body, or fold on the bracket body.

Further, in the preferred solution of some embodiments, the shooting bracket further includes a remote controller for controlling a shooting equipment, and the remote controller is detachably mounted on the auxiliary handle.

Compared with the existing technology, the shooting bracket provided by the embodiment of the present application mainly has the following beneficial effects:

the shooting bracket is provided with a first limiting part and a second limiting part meshed with each other to limit the position of the auxiliary handle when the auxiliary handle is folded on the bracket body, thereby realizing locking of the auxiliary handle in the folded state and preventing relative rotation or shaking between the auxiliary handle and the bracket body, and thus ensuring that the connection device connected to the auxiliary handle will not be affected by the auxiliary handle, but will always remain in a stable state.

Thus, the clamping device connected to the connection device can be prevented from rotating or shaking, that is, the shooting equipment clamped on the clamping device can be prevented from rotating or shaking, thereby improving the use stability of the shooting bracket and improving the shooting effect of the shooting equipment.

DESCRIPTION OF THE DRAWINGS

In order to more clearly illustrate the solutions of the present application, a brief introduction will be given below to the drawings needed to be used in the description of the embodiments. Obviously, the drawings in the following description are some embodiments of the present application. For those of ordinary skill in the art, other drawings can also be obtained based on these drawings without exerting creative efforts. In the drawings.

Figure 1:
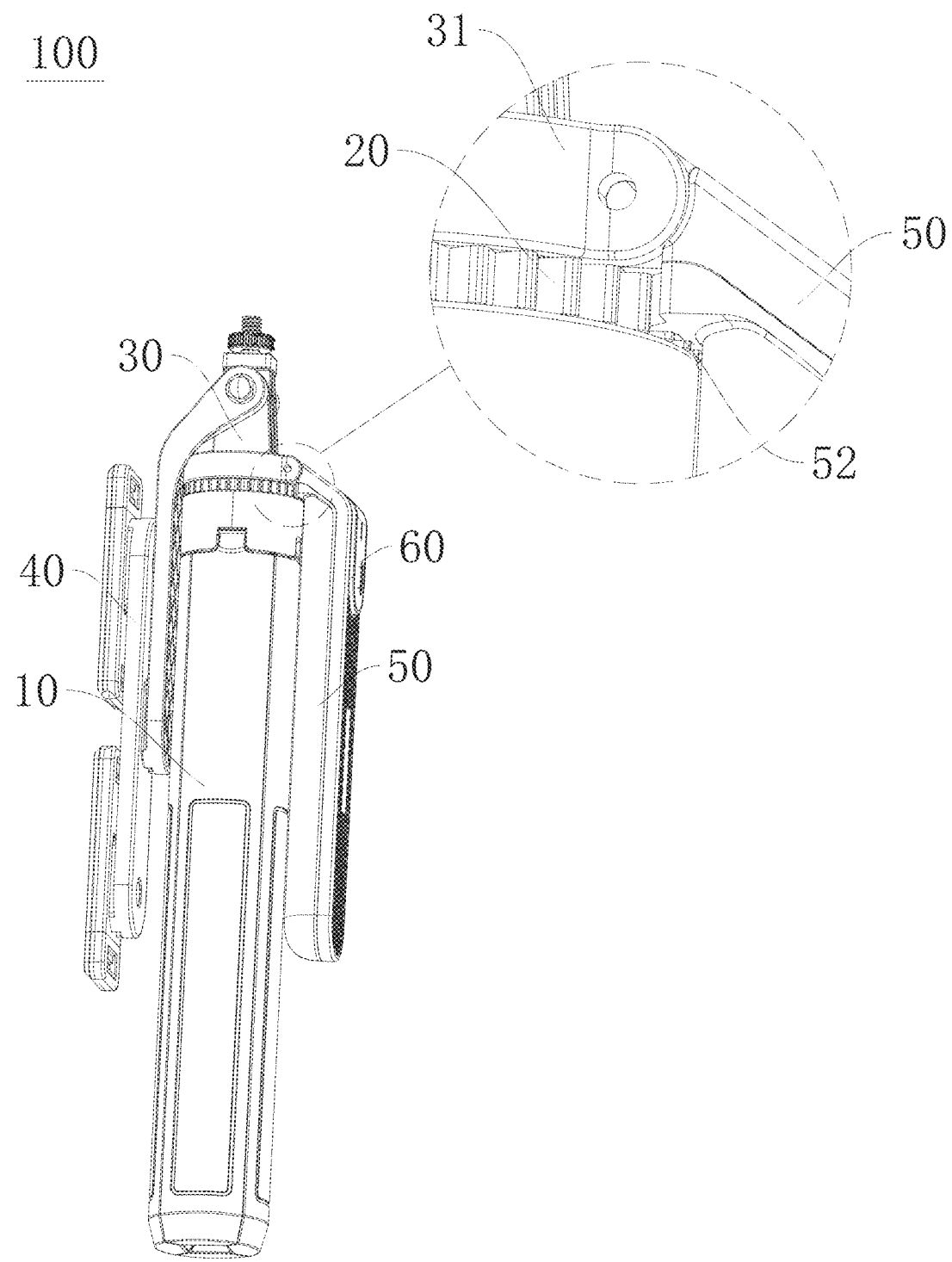
FIG. 1 is a first schematic diagram of the three-dimensional structure of the shooting bracket in one embodiment of the present application, in which the auxiliary handle and the clamping device are in a folded state.

The numbers in the drawings are as follows:
100. Shooting bracket;
10. Bracket body; 11. Plug-in hole; 12. Limiting hole;
20. First limiting part/gear; 21. Gear body; 22. Plug-in shaft; 23. Limiting protrusion; 24. Rotating connection groove;
30. Connection device; 31. Connection frame; 311. Rotating connection piece; 312. Opening; 313. Snap-fit buckle;
40. Clamping device;
50. Auxiliary handle; 51. Hinged end; 511. Snap-fit slot; 52. Second limit part/connection rack;
60. Remote controller.

DETAILED DESCRIPTION

Unless otherwise defined, all technical and scientific terms used herein have the same meanings as commonly understood by those skilled in the technical field of the present application; the terms used in the specification are only for the purpose of describing specific embodiments and are not intended to limit the present application, for example, the directions or positions indicated by the terms "length", "width", "upper", "lower", "left", "right", "front", "back", "vertical", "horizontal", "top", "bottom", "inside", "outside", etc. are based on the directions or positions shown in the drawings. They are only for convenience of description and cannot be understood as limitations of the present technical solution.

The terms "include" and "having" and any variations thereof in the description and claims of the present application and the description of the above drawings are intended to cover non-exclusive inclusion. The terms "first", "second", etc. in the description and claims of the present application or the above drawings are used to distinguish different objects and are not used to describe a specific order. "Plural" means two or more, unless otherwise expressly and specifically limited.

In the description and claims of the present application, as well as the above description of the drawings, when an element is referred to as being "fixed to" or "mounted on" or "disposed on" or "connected to" another element, it can be directly or indirectly located on the other element. For example, when an element is referred to as being "connected to" another element, it can be directly or indirectly connected to the other element.

Furthermore, reference herein to "an embodiment" means that a particular feature, structure or characteristic described in connection with the embodiment can be included in at least one embodiment of the present application. The appearances of this phrase in various places in the description are not necessarily all referring to the same embodiment, nor are separate or alternative embodiments mutually exclusive of other embodiments. Those skilled in the art understand, both explicitly and implicitly, that the embodiments described herein may be combined with other embodiments.

An embodiment of the present application provides a shooting bracket 100, which is used to support a shooting equipment (not shown). Wherein, the shooting equipment includes mobile phones, tablets and other electronic products. In addition, the shooting bracket 100 can be used handheld, or can be unfolded and placed on a support platform (not shown), or can be directly fixed and mounted at a target location.

As shown in FIGS. 1 to 4, the shooting bracket 100 includes a bracket body 10, a connection device 30, a clamping device 40 and an auxiliary handle 50 for the user to hold. Wherein, the bracket body 10 is a support component of the shooting bracket 100, which can be used for the user to hold, and can also be used to support the entire shooting bracket 100 on a support platform (specifically, the ground, a workbench, etc.).

In addition, in order to adjust the shooting angle of the shooting equipment, the connection device 30 is mounted on the bracket body 10 and can rotate around the extension direction of the bracket body 10 (specifically, the axial direction of the bracket body 10). The clamping device 40 is rotatably mounted on the connection device 30 to clamp the shooting equipment. Preferably, the clamping device 40 is hingedly connected to the connection device 30.

It can be understood that when it is necessary to adjust the shooting angle of the shooting device, the user only needs to rotate the connection device 30 and the clamping device 40 to adjust the angle of the shooting device, thereby meeting the user's shooting needs.

It should be noted that in this embodiment, the rotation axis of the connection device 30 around the bracket body 10 and the rotation axis of the clamping device 40 around the connection device 30 are perpendicular to each other, so that the clamping device 40 has greater rotational freedom.

It should also be noted that the clamping device 40 can be an existing structure or an innovative structure, as long as it can clamp the shooting equipment, and the present application does not limit this.

In addition, in order to improve the stability of the movement of the shooting equipment during movement, the auxiliary handle 50 has a hinged end 51, and the auxiliary handle 50 is rotatably mounted on the connection device 30 through the hinged end 51 so that the auxiliary handle 50 can perform pitching motions relative to the bracket body 10. It can be understood that during the mobile shooting process, the user can hold and rotate the auxiliary handle 50, the auxiliary handle 50 drives the connection device 30 to rotate, and the connection device 30 drives the clamping device 40 to rotate, thereby driving the shooting equipment on the clamping device 40 to rotate to adjust the shooting angle and position of the shooting device during movement.

Using the above technical solution, the user can hold the auxiliary handle 50 for shooting during movement to reduce the shaking of the shooting equipment, thereby improving the use stability of the shooting bracket 100 and thus improving the shooting quality of the shooting equipment. In addition, the auxiliary handle 50 is rotatably mounted on the connection device 30, so that the position of the auxiliary handle 50 itself can be changed, which facilitates folding and storage of the auxiliary handle 50, or changing the extension angle of the user's hand and arm, thereby improving the user's use experience.

Figure 4:
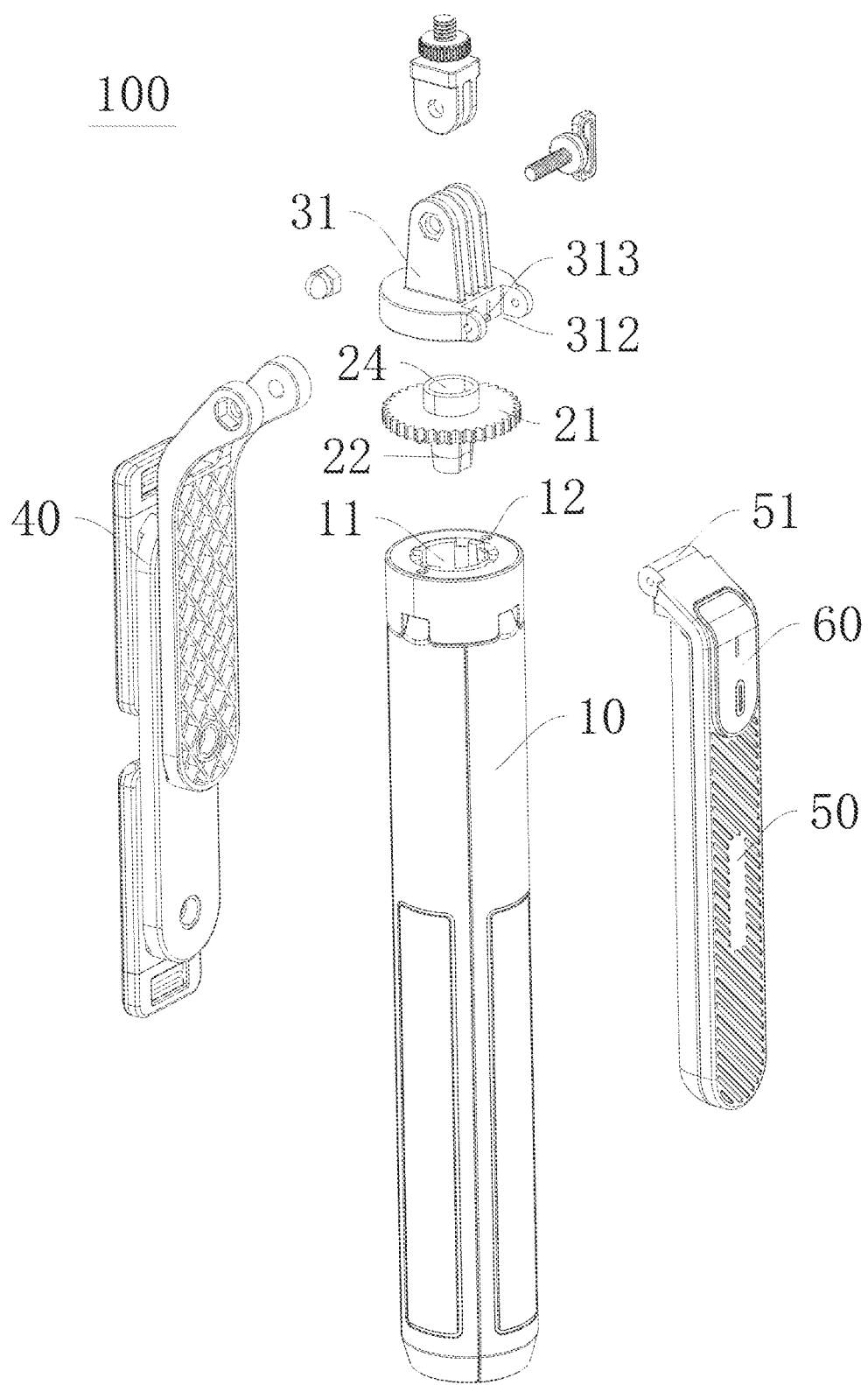
FIG. 4 is an exploded structural schematic diagram of the shooting bracket in FIG. 1.

As shown in FIGS. 1 and 4, one of the bracket body 10 and the auxiliary handle 50 is provided with a first limiting part 20, and the other is provided with a second limiting part 52 matched with the first limiting part 20. When the auxiliary handle 50 is in a folded state (specifically, the auxiliary handle 50 is folded on the bracket body 10), by meshing of the first limiting part 20 and the second limiting part 52, the relative rotation is prevented between the auxiliary handle 50 and the bracket body 10.

To sum up, compared with the prior art, the shooting bracket 100 at least has the following beneficial effects:

the shooting bracket 100 is provided with the first limiting part 20 and the second limiting part 52 meshed with each other, so that when the auxiliary handle 50 is folded on the bracket body 10, the position of the auxiliary handle 50 is limited, thereby realizing the locking of the auxiliary handle 50 in the folded state, preventing relative rotation or shaking between the auxiliary handle 50 and the bracket body 10, thereby ensuring that the connection device 30 connected to the auxiliary handle 50 is not affected by the auxiliary handle 50, but always maintains a static state stably.

Therefore, the clamping device 40 connected to the connection device 30 can be prevented from rotating or shaking, that is, the shooting equipment clamped on the clamping device 40 can be prevented from rotating or shaking, thereby improving the use stability of the shooting bracket 100 and improving the shooting effect of the shooting equipment.

In order to enable those skilled in the art to better understand the solution of the present application, the technical solution in the embodiment of the present application will be clearly and completely described below with reference to the accompanying drawings 1 to 7.

Further, as a specific implementation in some embodiments of the present application, as shown in FIGS. 1 and 4, a gear 20 is provided on the top of the bracket body 10 to form the first limiting part 20, and a connection rack 52 matched with the gear 20 is provided at a position of the auxiliary handle 50 near the hinged end 51 to form the second limiting part 52. When the auxiliary handle 50 is in the folded state, the auxiliary handle 50 is locked on the bracket body 10 through the mutual meshing between the connection rack 52 and the gear 20, thereby restricting the clamping device 40 connected to the connection device 30 from rotating around the extension direction of the bracket body 10.

It can be understood that when the auxiliary handle 50 is in the folded state, the user can hold the bracket body 10 and the auxiliary handle 50 to take pictures. Wherein, since the connection rack 52 and the gear 20 are in a meshing state, the connection device 30 is restricted from rotating around the extending direction of the bracket body 10. That is, the clamping device 40 is restricted from rotating around the extending direction of the bracket body 10, thereby realizing that the auxiliary handle 50 is locked in the folded state to avoid the problem that when the shooting bracket 100 is used with the auxiliary handle 50 being folded, the clamping device 40 rotates or shakes, affecting the shooting effect.

Of course, in other embodiments, the gear 20 can also be disposed on the auxiliary handle 50, the connection rack 52 can be disposed on the top of the bracket body 10, and the first limiting part 20 and the second limiting part 52 can also be other structures that can be meshed with each other to plays a position-limiting role, the present application does not limit this, and those skilled in the art can choose according to the actual situation.

Figure 3:
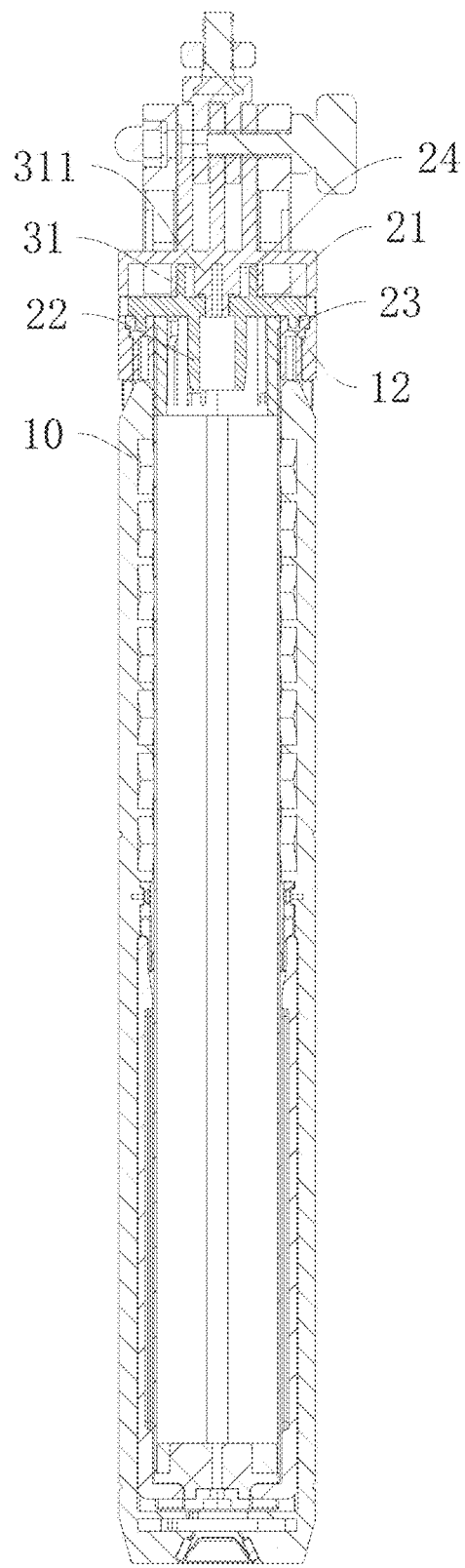
FIG. 3 is a cross-sectional schematic diagram of the shooting bracket in FIG. 1.

Further, as a specific implementation of the shooting bracket 100 provided by the present application, as shown in FIGS. 3 and 4, in order to facilitate the installation and positioning of the gear 20, the gear 20 includes a gear body 21 with gear teeth and a plug-in shaft 22 axially provided on one side of the gear body 21. Between the connection device 30 and the bracket body 10, the gear 20 is rotatably connected to the connection device 30, and is plugged into the top of the bracket body 10 through the plug-in shaft 22.

In detail, the gear body 21 is provided with a plug-in shaft 22 on one side facing the bracket body 10. The top of the bracket body 10 is provided with a plug-in hole 11 that matches the plug-in shaft 22. When the gear 20 needs to be mounted, operate personnel only need to plug the plug-in shaft 22 into the plug-in hole 11 to mount the gear 20 on the top of the bracket body 10.

It should be noted that by using the positioning and installation method of the plug-in shaft 22 and the plug-in hole 11, firstly, the gear 20 can be quickly positioned and installed, thereby greatly improving the production efficiency of the product; secondly, the installation offset of the gear 20 can be avoided. The offset will cause the problem of motion interference between the auxiliary handle 50 and the gear 20 during the folding process.

Figure 6:
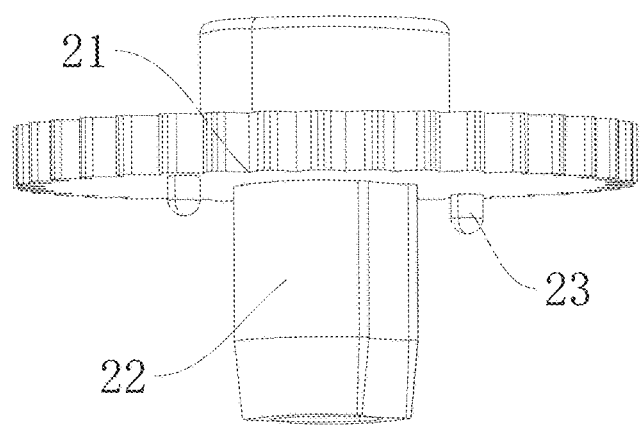
FIG. 6 is a schematic diagram of the three-dimensional structure of the gear in FIG. 4.

Further, as a specific implementation of the shooting bracket 100 provided by the present application, as shown in FIGS. 3, 4 and 6, a limiting structure is provided between the gear body 21 and the bracket body 10, and the limiting structure includes a limiting protrusion 23 and a limiting hole 12 matched with the limiting protrusion 23. Wherein, one of the gear body 21 and the bracket body 10 is provided with the limiting protrusion 23, and the other is provided with the limiting hole 12. When the gear 20 is plugged into the bracket body 10, the limiting protrusion 23 extends into the limiting hole 12 to limit the rotation of gear 20.

In this embodiment, two limiting protrusions 23 are provided on the side of the gear body 21 facing the bracket body 10, and the two limiting protrusions 23 are arranged symmetrically along the center of the gear 20, and limiting holes 12 are arranged at corresponding positions of the top of the bracket body 10. When the gear 20 is plugged into the bracket body 10, each limiting protrusion 23 extends into the corresponding limiting hole 12 to limit the rotation of the gear 20.

It can be understood that when the auxiliary handle 50 is folded on the bracket body 10, the connection rack 52 and the gear teeth on the gear body 21 of the gear 20 are meshed with each other. When the user moves the shooting bracket 100, the auxiliary handle 50 is acted upon by an external force and will have a tendency to rotate, but due to the meshing between the limiting protrusion 23 and the limiting hole 12, the rotation of the gear 20 is restricted, making the gear 20 limit the rotation of the auxiliary handle 50 to ensure that the auxiliary handle 50 in the shooting bracket 100 is always in a locked state, thereby preventing relative rotation or shaking between the auxiliary handle 50 and the bracket body 10, thereby improving the use stability of the shooting bracket 100.

Of course, in other embodiments, the limiting protrusion 23 can also be provided on the top of the bracket body 10, and the limiting hole 12 is provided on the side of the gear body 21 facing the bracket body 10. The number of the limiting protrusions 23 and the limiting holes 12 can also be 4, 6 or other numbers. The present application does not limit this, and those skilled in the art can choose according to the actual situation.

Figure 7:
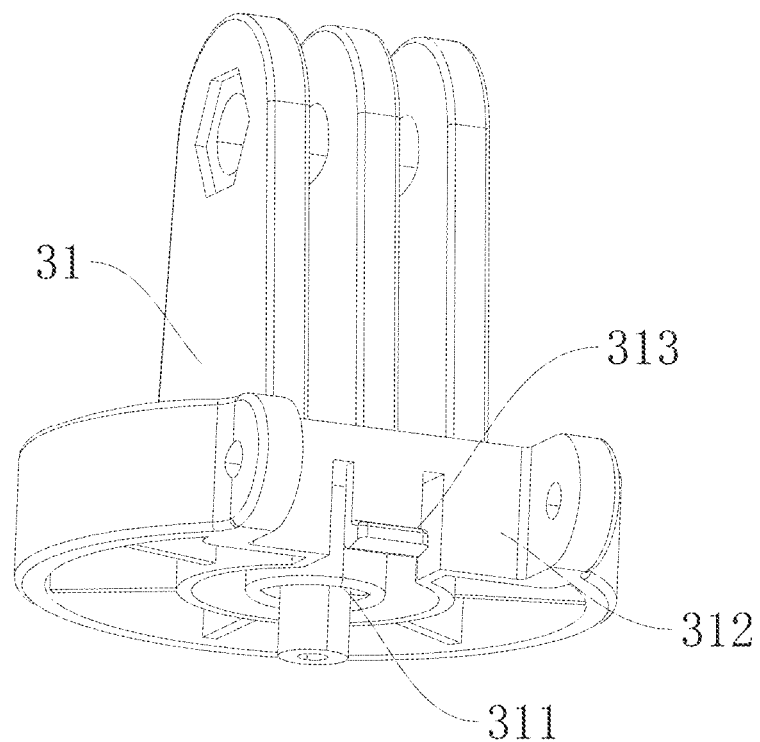
FIG. 7 is a schematic diagram of the three-dimensional structure of the connection frame in FIG. 4.

In this embodiment, as shown in FIGS. 3, 4 and 7, the connection device 30 includes a connection frame 31. The connection frame 31 is rotatably mounted on the side of the gear 20 away from the bracket body 10, and is rotatably connected to the clamping device 40. Specifically, the gear body 21 of the gear 20 is provided with a boss (not shown) on one side close to the connection frame 31. A rotating connection groove 24 is recessed on the boss, and the connection frame 31 is provided with a rotating connection piece 311. The rotating connection piece 311 is plugged into the rotating connection groove 24 to realize the rotating connection between the connection frame 31 and the gear 20.

In addition, the auxiliary handle 50 is rotatably mounted on the connection frame 31, and the rotation axis of the auxiliary handle 50 around the connection frame 31 is perpendicular to the rotation axis of the connection frame 31 around the bracket body 10, so that the auxiliary handle 50 can be rotated and folded on the bracket body 10, that is, in a folded state; or the auxiliary handle 50 can be rotated and unfolded relative to the bracket body 10 for the user to hold.

In detail, the connection device 30 also includes a latch (not shown). An opening 312 is provided on the peripheral side of the connection frame 31. The hinged end 51 of the auxiliary handle 50 is plugged into the opening 312. The latch passes through the connection frame 31 and the auxiliary handle 50 in turn, so that the auxiliary handle 50 is rotatably connected to the connection frame 31.

It can be understood that when it is necessary to use the auxiliary handle 50, the user rotates the auxiliary handle 50 in a direction away from the bracket body 10, and the auxiliary handle 50 ca be unfolded relative to the bracket body 10 with the central axis of the latch as the rotation axis for the user to hold. When the auxiliary handle 50 is not in use, the user rotates the auxiliary handle 50 in a direction close to the bracket body 10, and the auxiliary handle 50 can be rotated and folded on the bracket body 10 with the central axis of the latch as the rotation axis, that is, in a folded state.

Figure 5:
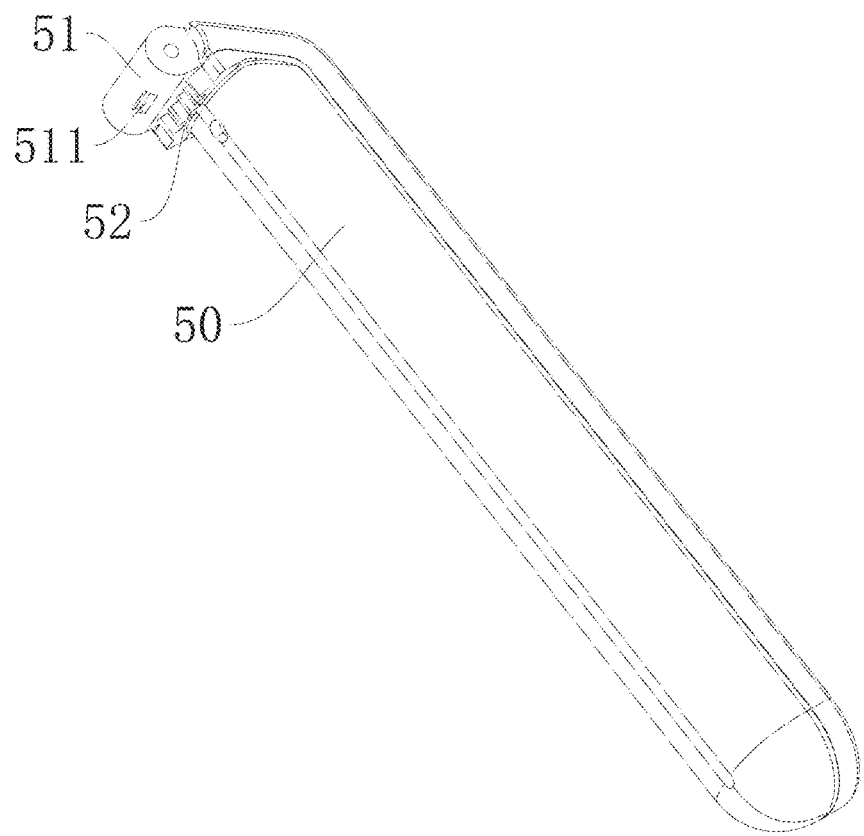
FIG. 5 is a schematic diagram of the three-dimensional structure of the auxiliary handle in FIG. 4.

Further, as a specific implementation of the shooting bracket 100 provided by the present application, as shown in FIGS. 4, 5 and 7, in order to avoid the problem of the auxiliary handle 50 swinging up and down after being folded, in the opening 312, a snap-fit structure is provided between the connection frame 31 and the hinged end 51. Wherein, the snap-fit structure includes a snap-fit buckle 313 and a snap-fit slot 511 that matches the snap-fit buckle 313. One of the connection frame 31 and the hinged end 51 is provided with the snap-fit buckle 313, and the other is provided with the snap-fit slot 511. When the auxiliary handle 50 is in the folded state, the snap-fit buckle 313 is locked in the snap-fit slot 511.

In this embodiment, the connection frame 31 is provided with the snap-fit buckle 313 in the opening 312, and the hinged end 51 of the auxiliary handle 50 is provided with the snap-fit slot 511. When the auxiliary handle 50 is in a folded state, the snap-fit buckle 313 is meshed with the snap-fit slot 511 to limit the position of the auxiliary handle 50, thereby avoiding the problem that the auxiliary handle 50 swings up and down and reduces the stability of the shooting bracket 100 when it is folded and not in use.

Of course, in other embodiments, the snap-fit buckle 313 can also be provided on the hinged end 51 of the auxiliary handle 50, and the snap-fit slot 511 is provided in the opening 312 of the connection frame 31. The present application does not limit this. Those skilled in the art can choose according to actual situation.

Furthermore, as a specific implementation of the shooting bracket 100 provided by the present application, the shooting bracket 100 also includes a plurality of support legs (not shown), each of which is rotatably mounted on the bracket body 10 to unfold relative to the bracket or fold on the bracket body 10. Preferably, each support leg is hingedly connected to the bracket body 10.

It can be understood that when the shooting bracket 100 needs to be supported on the support platform, the user exerts a force on the support leg, causing the support leg to rotate in a direction away from the bracket body 10 with its hinged end as the center to be unfold and supported on the support platform. When it is necessary to hold the shooting bracket 100 to shoot, the user exerts a force opposite to the above on the support leg, causing the support leg to rotate in a direction close to the bracket body 10 with its hinged end as the center, so as to be folded on the bracket body 10, and together with the bracket body 10 to form a handle.

Therefore, firstly, after the support legs are unfolded, the shooting bracket 100 can be stably supported on the support platform, improving the stability of shooting; secondly, after the support legs are folded, the bracket body 10 can be turned into a handle for the user to hold and use, or store conveniently, reducing the space occupied.

Figure 2:
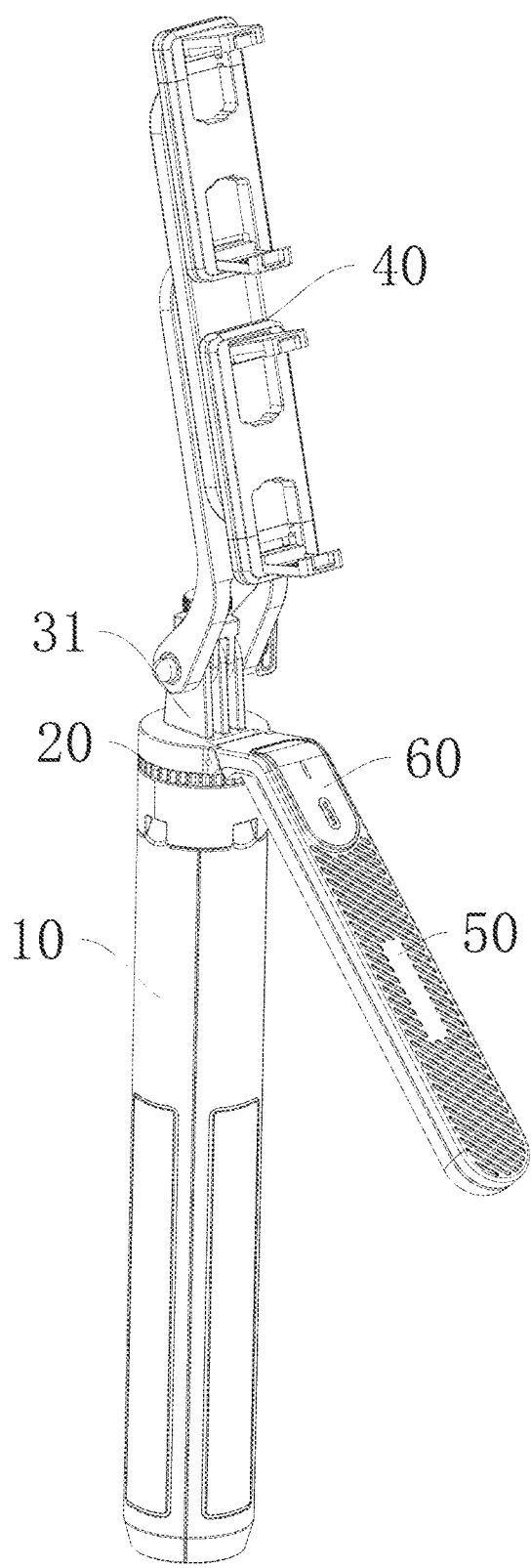
FIG. 2 is a second schematic diagram of the three-dimensional structure of the shooting bracket in one embodiment of the present application, in which the auxiliary handle and the clamping device are in an unfolded state.

Further, as a specific implementation of the shooting bracket 100 provided by the present application, as shown in FIGS. 1 and 2, in order to remotely control the shooting equipment to take pictures, the shooting bracket 100 also includes a remote controller 60 for controlling the shooting equipment, the remote controller 60 is detachably mounted on the auxiliary handle 50. Specifically, in this embodiment, a storage slot (not shown) is provided on the auxiliary handle 50, and the remote controller 60 is detachably connected to the auxiliary handle 50 in the storage slot through a magnetic attraction structure (not shown). Of course, in other embodiments, other detachable structures such as bonding can also be used. The present application does not limit this, and those skilled in the art can choose according to actual situation.

It should be noted that when the user performs handheld shooting, the remote controller 60 is placed in the storage slot, and the control buttons of the remote controller 60 are exposed to the opening position of the storage slot, thereby facilitating the control of shooting. When the user places the shooting bracket 100 on the support platform, the user can take out the remote controller 60 from the storage slot, thereby enabling remote control of the electronic device for taking pictures.

The above descriptions are only preferred embodiments of the present application and are not intended to limit the present application. For those skilled in the art, various modifications and changes may be made to the present application. Any modifications, equivalent substitutions, improvements, etc. made within the spirit and principles of the present application shall be included in the scope of the claims of the present application.

What is claimed is:

1. A shooting bracket, wherein the shooting bracket includes:
    a bracket body, a connection device, a clamping device and an auxiliary handle with a hinged end;
    the connection device is mounted on the bracket body and is rotatable around an extension direction of the bracket body;
    the clamping device is rotatably mounted on the connection device;
    the hinged end of the auxiliary handle is rotatably mounted on the connection device, so that the auxiliary handle can perform pitching motion relative to the bracket body;
    one of the bracket body and the auxiliary handle is provided with a first limiting part, and the other is provided with a second limiting part matched with the first limiting part; when the auxiliary handle is in a folded state, through meshing of the first limiting part and the second limiting part, relative rotation between the auxiliary handle and the bracket body is prevented;
    wherein, a gear is provided on a top of the bracket body to form the first limiting part; a connection rack is provided at an end of the auxiliary handle and close to the hinged end, and the connection rack matches the gear to form the second limiting part;
    when the auxiliary handle is in a folded state, the auxiliary handle is locked on the bracket body through the mutual meshing between the connection rack and the gear;
    the gear includes a gear body with gear teeth and a plug-in shaft axially disposed on one side of the gear body; between the connection device and the bracket body, the gear is rotatably connected to the connection device and plugged into the top of the bracket body through the plug-in shaft.

2. The shooting bracket according to claim 1, wherein a limiting structure is provided between the gear body and the bracket body, and the limiting structure includes a limiting protrusion and a limiting hole;
    wherein, one of the gear body and the bracket body is provided with the limiting protrusion, and the other is provided with the limiting hole; when the gear is plugged into the bracket body, the limiting protrusion extends into the limiting hole to limit rotation of the gear.

3. The shooting bracket according to claim 2, wherein the number of the limiting protrusions is two, and the two limiting protrusions are provided on a side of the gear body facing the bracket body and arranged symmetrically along the center of the gear.

4. The shooting bracket according to claim 3, wherein the connection device includes a connection frame, the connection frame is rotatably mounted on a side of the gear away from the bracket body, and is rotatably connected with the clamping device;
    the auxiliary handle is rotatably mounted on the connection frame, and a rotation axis of the auxiliary handle around the connection frame is perpendicular to a rotation axis of the connection frame around the bracket body.

5. The shooting bracket according to claim 4, wherein an opening is provided on a peripheral side of the connection frame, and the hinged end of the auxiliary handle is plugged into the opening, so that the auxiliary handle is rotatably connected to the connection frame.

6. The shooting bracket according to claim 5, wherein in the opening, a snap-fit structure is provided between the connection frame and the hinged end; the snap-fit structure includes a snap-fit buckle and a snap-fit slot matched with the snap-fit buckle, one of the connection frame and the hinged end is provided with the snap-fit buckle, and the other is provided with the snap-fit slot; when the auxiliary handle is in a folded state, the snap-fit buckle is snapped in the snap-fit slot.

7. The shooting bracket according to claim 2, wherein the connection device includes a connection frame, the connection frame is rotatably mounted on a side of the gear away from the bracket body, and is rotatably connected with the clamping device;
    the auxiliary handle is rotatably mounted on the connection frame, and a rotation axis of the auxiliary handle around the connection frame is perpendicular to a rotation axis of the connection frame around the bracket body.

8. The shooting bracket according to claim 7, wherein an opening is provided on a peripheral side of the connection frame, and the hinged end of the auxiliary handle is plugged into the opening, so that the auxiliary handle is rotatably connected to the connection frame.

9. The shooting bracket according to claim 8, wherein in the opening, a snap-fit structure is provided between the connection frame and the hinged end; the snap-fit structure includes a snap-fit buckle and a snap-fit slot matched with the snap-fit buckle, one of the connection frame and the hinged end is provided with the snap-fit buckle, and the other is provided with the snap-fit slot; when the auxiliary handle is in a folded state, the snap-fit buckle is snapped in the snap-fit slot.

10. The shooting bracket according to claim 1, wherein the connection device includes a connection frame, the connection frame is rotatably mounted on a side of the gear away from the bracket body, and is rotatably connected with the clamping device;
    the auxiliary handle is rotatably mounted on the connection frame, and a rotation axis of the auxiliary handle around the connection frame is perpendicular to a rotation axis of the connection frame around the bracket body.

11. The shooting bracket according to claim 10, wherein an opening is provided on a peripheral side of the connection frame, and the hinged end of the auxiliary handle is plugged into the opening, so that the auxiliary handle is rotatably connected to the connection frame.

12. The shooting bracket according to claim 11, wherein in the opening, a snap-fit structure is provided between the connection frame and the hinged end; the snap-fit structure includes a snap-fit buckle and a snap-fit slot matched with the snap-fit buckle, one of the connection frame and the hinged end is provided with the snap-fit buckle, and the other is provided with the snap-fit slot; when the auxiliary handle is in a folded state, the snap-fit buckle is snapped in the snap-fit slot.

13. The shooting bracket according to claim 1, wherein the shooting bracket further includes a plurality of support legs, each of the support legs is rotatably mounted on the bracket body to unfold relative to the bracket body, or fold on the bracket body.

14. The shooting bracket according to claim 1, wherein the shooting bracket further includes a remote controller for controlling a shooting equipment, and the remote controller is detachably mounted on the auxiliary handle.

\* \* \* \* \*